Oct. 8, 1935.  I. MOELLER  2,016,610
BOLT
Filed June 16, 1934
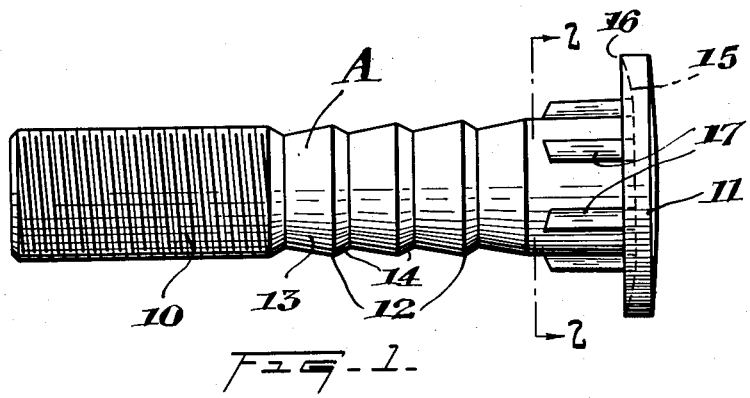
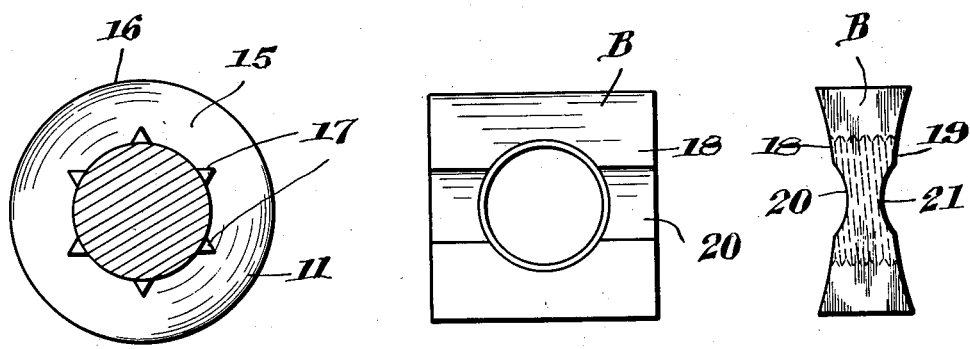
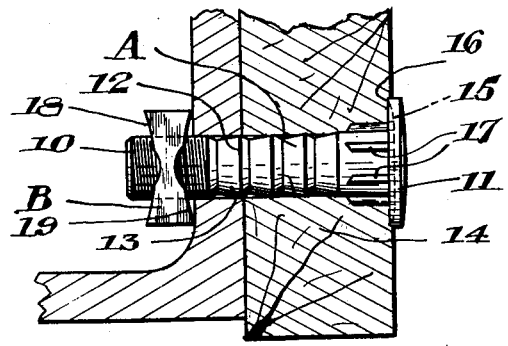
Inventor
Isak Moeller
By Eugene E. Stevens
Atty Patented Oct. 8, 1935

2,016,610

UNITED STATES PATENT OFFICE 2,016,610

BOLT

Isak Moeller, New Glasgow, Nova Scotia, Canada

Application June 16, 1934, Serial No. 730,985

1 Claim. (Cl. 85—1)

This invention relates to improvements in bolts, particularly to weatherproof bolts such as are used for the purpose of fastening boards to steel frame box cars, and the objects of the invention are to prevent the leakage of water around the bolt which would impair the contents of the car and cause damage to the commodities contained therein.

Further objects of the invention are to provide such a bolt to shed the water and prevent it getting in under the head of the bolt, and generally to improve and simplify the construction of the bolt.

In its construction the invention includes a bolt having a series of deep ridges gradually increasing in diameter towards the head of the bolt, the said head being undercut and provided with a sharp edged circumference adapted to dig into the wood and the shank being provided with a plurality of longitudinal ridges adapted to prevent turning thereof, all as hereinafter more fully set forth and described in the accompanying specification and drawing.

In the drawing—

Figure 1 is a plan view of the bolt.

Figure 2 is a section on the line 2—2 of Figure 1.

Figure 3 is a plan view of the nut used in the bolt.

Figure 4 is a side view of the nut.

Figure 5 is a sectional elevation showing the bolt and nut in position to secure a board to the steel frame of a car.

In the drawing like characters of reference indicate corresponding parts in all the figures.

Referring to the drawing, A indicates the bolt as a whole, which is screw threaded at 10 and provided with a head 11. In accordance with the present invention between the screw threading and the head of the bolt a series of deep ridges 12 are formed, the first ridge being near the threaded end and being slightly larger than the thread diameter, each succeeding ridge being slightly increased in diameter, so that when the bolt is driven into the wood it will maintain a close fit and the ridges exert a pressure against the wood, and should any moisture seep through, it will lodge in the small compartment created by the ridge and eventually evaporate.

It will be observed that each ridge is formed with two meeting conical surfaces 13 and 14, the surface 14 being shorter than the surface 13, the latter extending towards the screw threaded edge of the bolt. This arrangement enables the bolt to be readily inserted and causes the ridge to act in a ratchet like manner to prevent withdrawal.

The head 11 of the bolt is undercut at 15 to form a sharp edged circumference 16 which will dig into the wood, keeping the bolt tight and preventing leakage. To prevent turning of the bolt a plurality of longitudinally extending ridges 17 are uniformly spaced about the head of the shank and are designed to cut the wood with the least possible pressure when the bolt is driven in to prevent splitting of the wood.

B indicates the nut designed to be used with the bolt, being designed to pinch the bolt with a spring pressure when tightened. For this purpose the top and bottom 18 and 19 of the nut are concaved towards each other and transverse recesses 20 and 21 are provided at the centre of these concave portions. The thickness of the nut being thus reduced towards the centre, it will spring slightly when tightened on the bolt as shown in Figure 5.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claim.

What I claim as my invention is:

A water-proof bolt comprising a threaded shank having at one end a head undercut to provide a sharp edge and a water-tight seal about the head, a plurality of longitudinally extending spaced ribs on the shank adjacent to the head to lock the bolt against rotation and a plurality of adjacent annular ridges on the shank co-operating to block the entrance of water into the bolt hole, each of said ridges being formed of two meeting, frustro-conical faces, one being longer than the other.

ISAK MOELLER.